(12) United States Patent
Nalbant

(10) Patent No.: US 9,153,973 B2
(45) Date of Patent: Oct. 6, 2015

(54) ACTIVE CELL BALANCING

(76) Inventor: Mehmet Kadri Nalbant, Cupertino, CA (US)

( * ) Notice: Subject to any disclaimer, the term of this patent is extended or adjusted under 35 U.S.C. 154(b) by 578 days.

(21) Appl. No.: 13/494,255

(22) Filed: Jun. 12, 2012

(65) Prior Publication Data

US 2012/0313441 A1 Dec. 13, 2012

Related U.S. Application Data

(60) Provisional application No. 61/496,392, filed on Jun. 13, 2011.

(51) Int. Cl.
*H02J 7/00* (2006.01)

(52) U.S. Cl.
CPC ............ *H02J 7/0016* (2013.01); *Y10T 307/696* (2015.04); *Y10T 307/76* (2015.04)

(58) Field of Classification Search
CPC ........................................................ H02J 7/0016
USPC ............................................................. 320/119
See application file for complete search history.

(56) References Cited

U.S. PATENT DOCUMENTS

| | | | |
|---|---|---|---|
| 2010/0225275 A1* | 9/2010 | Bucur et al. | 320/116 |
| 2012/0293129 A1* | 11/2012 | Naghshtabrizi et al. | 320/118 |
| 2013/0148382 A1* | 6/2013 | Rosenblad | 363/16 |
| 2013/0214724 A1* | 8/2013 | Schwartz | 320/103 |
| 2013/0214733 A1* | 8/2013 | Liang et al. | 320/108 |
| 2014/0239898 A1* | 8/2014 | Tsai | 320/118 |

* cited by examiner

*Primary Examiner* — Suresh Memula

(57) ABSTRACT

A battery cell balancing system includes N switching circuits connected to first terminals and second terminals of N battery cells, respectively, where N is an integer greater than one. A first transformer includes a first core and N sets of windings wound around the first core. The N sets of windings are connected to the N switching circuits, respectively. A first control module controls switching of the N switching circuits to reverse first connections between the first terminals and the second terminals of the N battery cells and the N sets of windings, respectively, at a first frequency to balance charge levels of the N battery cells.

18 Claims, 5 Drawing Sheets ations.

ACTIVE CELL BALANCING

CROSS-REFERENCE TO RELATED APPLICATIONS

This application claims the benefit of U.S. Provisional Application No. 61/496,392, filed on Jun. 13, 2011. The entire disclosure of the above application is incorporated herein by reference.

FIELD

The present disclosure relates to battery systems with multiple battery cells, and more particularly to a cell balancing system for battery systems with multiple battery cells.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Electric vehicles and hybrid vehicles typically include a battery system and an electric motor that are used to propel the vehicle. The battery systems typically include a plurality of battery cells that are connected together. During operation of the vehicle, the battery cells are discharged and may be recharged by a utility and/or during operation using regenerative braking.

Battery systems for electric vehicles may cost on the order of $5000 or more, which makes the battery system one of the most expensive components of the vehicle. Given the cost of replacement, the service life of the battery system should be as long as possible. Battery life for most types of battery cells is related to the number of charge/discharge cycles and the depth of discharge. For example only, for Lithium Ion (LiIon) battery cells, the estimated number of cycles is equal to Cycles=$20 \cdot 10^6 \cdot DOD^{-2}$, where DOD is depth of discharge as a percentage. When operating a LiIon battery cell between 100% and 15%, the estimated number of cycles is 2768. When operating a LiIon battery cell between 100% and 20%, the estimated number of cycles is 3125, which is approximately 11% greater cycle life as compared to discharging to 15%. Thus, controlling the battery discharge level can impact service life.

Control systems may set a target discharge level to a desired value such as 20% (rather than a lower level such as 15%) to receive the benefit of the longer service life. The battery system will need to be replaced when one of the battery cells in the battery system reaches the end of its service life. If the control system is not accurate in maintaining the desired discharge level for each battery cell, one or more of the battery cells may be regularly discharged to a lower state of charge (i.e. below 20%) than others of the battery cells, which will prematurely end the service life of the battery system. The remaining service life of the other battery cells that were not discharged below the target discharge level will be wasted.

SUMMARY

This section provides a general summary of the disclosure, and is not a comprehensive disclosure of its full scope or all of its features.

A battery cell balancing system includes N switching circuits connected to first terminals and second terminals of N battery cells, respectively, where N is an integer greater than one. A first transformer includes a first core and N sets of windings wound around the first core, wherein the N sets of windings are connected to the N switching circuits, respectively. A first control module controls switching of the N switching circuits to reverse first connections between the first terminals and the second terminals of the N battery cells and the N sets of windings, respectively, at a first frequency to equalize charge levels of the N battery cells.

In other features, the N battery cells are connected in series. Each of the N switching circuits includes a first switch and a second switch connected in series between the first terminal and the second terminal of one of the N battery cells and a third switch and a fourth switch connected in series between the first terminal and the second terminal of the one of the N battery cells. A first terminal of one of the N sets of windings is connected between the first switch and the second switch. A second terminal of the one of the N sets of windings is connected between the third switch and the fourth switch.

In other features, the first control module switches the first switch and the fourth switch on and the second switch and the third switch off during one portion of a switching period. The first control module switches the first switch and the fourth switch off and the second switch and the third switch on during another portion of the switching period.

A battery system comprises M battery subgroups, wherein M is an integer greater than one. Each of the M battery subgroups includes the battery cell balancing system and the N battery cells.

In other features, M switching circuits are connected to a first terminal and a second terminal of M battery subgroups, respectively. A second transformer includes a second core and M sets of windings wound around the second core. The M sets of windings are connected to the M switching circuits, respectively. A second control module controls switching of the M switching circuits to reverse second connections between the first terminal and the second terminal of the M battery subgroups and the M sets of windings, respectively, at a second frequency to equalize charge levels of the M battery subgroups.

In other features, the first frequency is equal to the second frequency. Each of the M switching circuits includes a first switch and a second switch connected in series between the first terminal and the second terminal of one of the M battery subgroups and a third switch and a fourth switch connected in series between the first terminal and the second terminal of the one of the M battery subgroups. A first terminal of one of the M sets of windings is connected between the first switch and the second switch and a second terminal of the one of the M sets of windings is connected between the third switch and the fourth switch.

In other features, the second control module switches the first switch and the fourth switch on and the second switch and the third switch off during one portion of a switching period. The control module switches the first switch and the fourth switch off and the second switch and the third switch on during another portion of the switching period.

In other features, the first transformer includes N printed circuit boards each including a substrate defining a central opening. A conductive trace is formed on the substrate and is arranged around the central opening. The first core includes a first "E"-shaped core section and a second "E"-shaped core section. Middle legs of the first "E"-shaped core section and the second "E"-shaped core section are inserted into the central openings of the N printed circuit boards. Outer legs of the first "E"-shaped core section and the second "E"-shaped core section are arranged outside of the N printed circuit boards.

In other features, the second transformer includes M printed circuit boards each including a substrate defining a central opening. A conductive trace is formed on the substrate and is arranged around the central opening. The second core includes a first "E"-shaped core section and a second "E"-shaped core section. Middle legs of the first "E"-shaped core section and the second "E"-shaped core section are inserted into the central openings of the M printed circuit boards and outer legs of the first "E"-shaped core section and the second "E"-shaped core section are arranged outside of the M printed circuit boards.

A method of balancing battery cells in a battery subgroup includes connecting N switching circuits to first and second terminals of N battery cells, respectively, where N is an integer greater than one; connecting N sets of windings of a first transformer having a first core to the N switching circuits, respectively; and switching the N switching circuits to reverse first connections between the first terminal and the second terminal of the N battery cells and the N sets of windings, respectively, at a first frequency to equalize charge levels of the N battery cells.

In other features, the N battery cells are connected in series. Each of the N switching circuits includes a first switch and a second switch connected in series between the first terminal and the second terminal of one of the N battery cells and a third switch and a fourth switch connected in series between the first terminal and the second terminal of the one of the N battery cells. A first terminal of one of the N sets of windings is connected between the first switch and the second switch and a second terminal of the one of the N sets of windings is connected between the third switch and the fourth switch.

In other features, the switching of the N switching circuits includes switching the first switch and the fourth switch on and the second switch and the third switch off during one portion of a switching period and switching the first switch and the fourth switch off and the second switch and the third switch on during another portion of the switching period.

In other features, the method comprises providing M of the battery subgroups, where M is an integer greater than one; connecting M switching circuits to a first terminal and a second terminal of the M battery subgroups, respectively; connecting M sets of windings of a second transformer having a second core to the M switching circuits, respectively; and switching the M switching circuits to reverse second connections between the first terminal and the second terminal of the M battery subgroups and the M sets of windings, respectively, at a second frequency to equalize charge levels of the M battery subgroups.

In other features, the method includes switching the first connections at a first frequency and the second connections at a second frequency. The first frequency is equal to the second frequency.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The present disclosure will become more fully understood from the detailed description and the accompanying drawings, wherein.

DESCRIPTION

A cell balancing system according to the present disclosure balances the charge levels of the battery cells in a battery system during charging, charging during regeneration, discharging, quiescence and/or storage. By accurately performing cell balancing, the cell balancing system ensures that all of the battery cells will achieve the desired number of cycles during their service life.

According to the present disclosure, cell balancing is achieved in part by connecting the battery cells in parallel to a transformer. More particularly, sub-groups of battery cells are switchably connected together using the transformer, such as a high coupling coefficient, multi-winding transformer. The sub-groups are also switchably connected in parallel to another transformer to perform balancing between the sub-groups.

Figure 1:
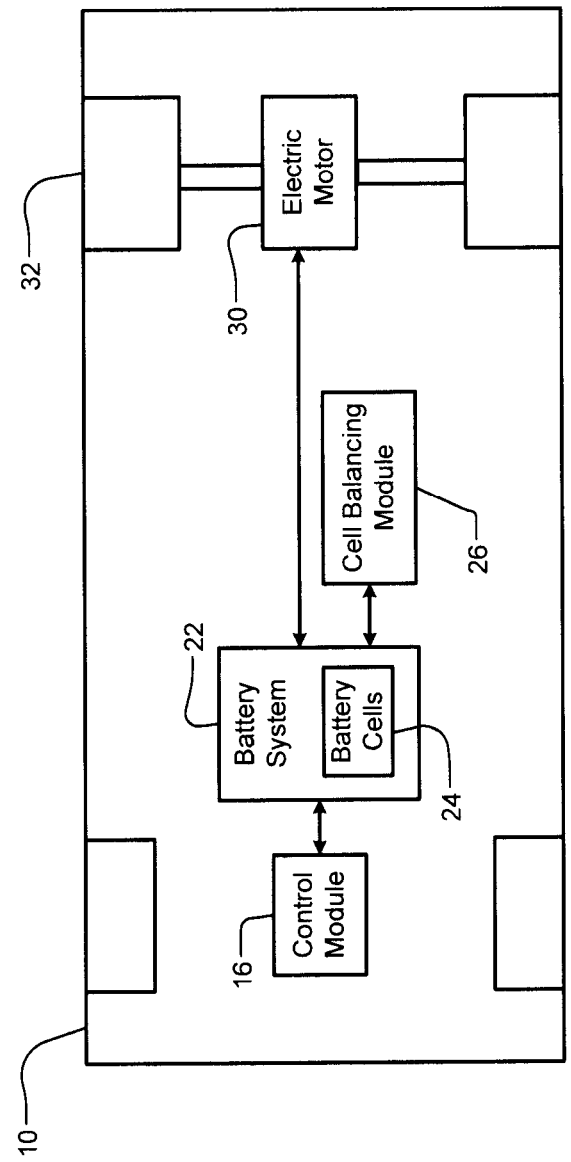
FIG. 1 is a functional block diagram of a vehicle including a battery system and a cell balancing system.

Referring now to FIG. 1, an example vehicle 10 is shown. The vehicle includes a powertrain control module 16 and a battery system 22 including a plurality of battery cells 24. A cell balancing module 28 according to the present disclosure balances the battery cells in the battery system 22 during charging, charging during regeneration, discharging, quiescence and/or storage. The battery system 22 supplies power to an electric motor 30, which drives one or more wheels 32 of the vehicle 10. While an electric vehicle is shown, the cell balancing system of the present disclosure may be applied to a variety of other applications such as hybrid vehicles and/or other non-automotive applications.

Figure 2:
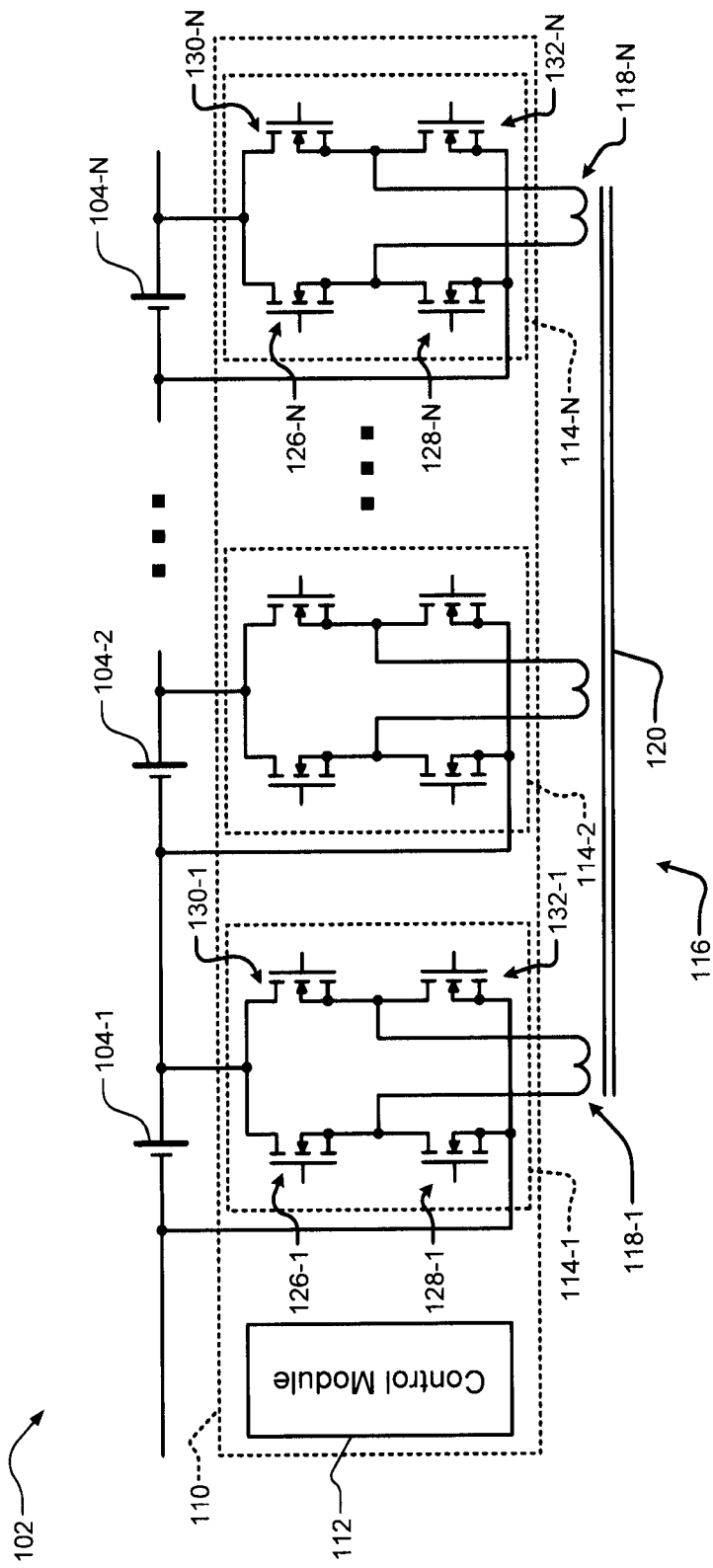
FIG. 2 is an electrical schematic and block diagram of a cell balancing system for a battery system including battery cells according to the present disclosure.

Referring now to FIG. 2, a first cell balancing system 110 for a battery system including one or more sub-groups 102 of battery cells 104-1, 104-2, ..., and 104-N (collectively battery cells 104) is shown, where N is an integer greater than 1. The battery cells 104 are connected in series.

The cell balancing system 110 includes a control module 112 that controls switching circuits 114-1, 114-2, ..., and 114-N (collectively switching circuits 114). Each of the switching circuits 114-1, 114-2, ..., and 114-N includes switches 126-1, 126-2, ..., and 126-N, 128-1, 128-2, ..., and 128-N, 130-1, 130-2, ..., and 130-N and 132-1, 132-2, ..., and 132-N, respectively.

For example, the switching circuit 114-1 includes series-connected switches 126-1 and 128-1 that are connected in parallel with series-connected switches 130-1 and 132-1. A second terminal of the switch 126-1 and a first terminal of the switch 128-1 are connected to one input of a transformer 116 (via one end of windings 118-1 wound around a core 120). A second terminal of the switch 130-1 and a first terminal of the switch 132-1 are connected to another input of the transformer 116 (via another end of windings 118-1 wound around the core 120).

First terminals of the switches 126-1 and 130-1 are connected to a first battery terminal of a corresponding one of the battery cells 104. For example, the first battery terminal may be a positive battery terminal of the battery cell 104-1. Second terminals of the switches 128-1 and 132-1 are connected to a second battery terminal of a corresponding one of the battery cells 104. For example, the second battery terminal may be a negative battery terminal of the battery cell 104-1.

In use, the switching circuits 114 switch the polarity of connection of the battery cell 104 to the transformer 116 at a first desired frequency, which equalizes the charge of the battery cells 104 in the sub-group 102.

Figure 3:
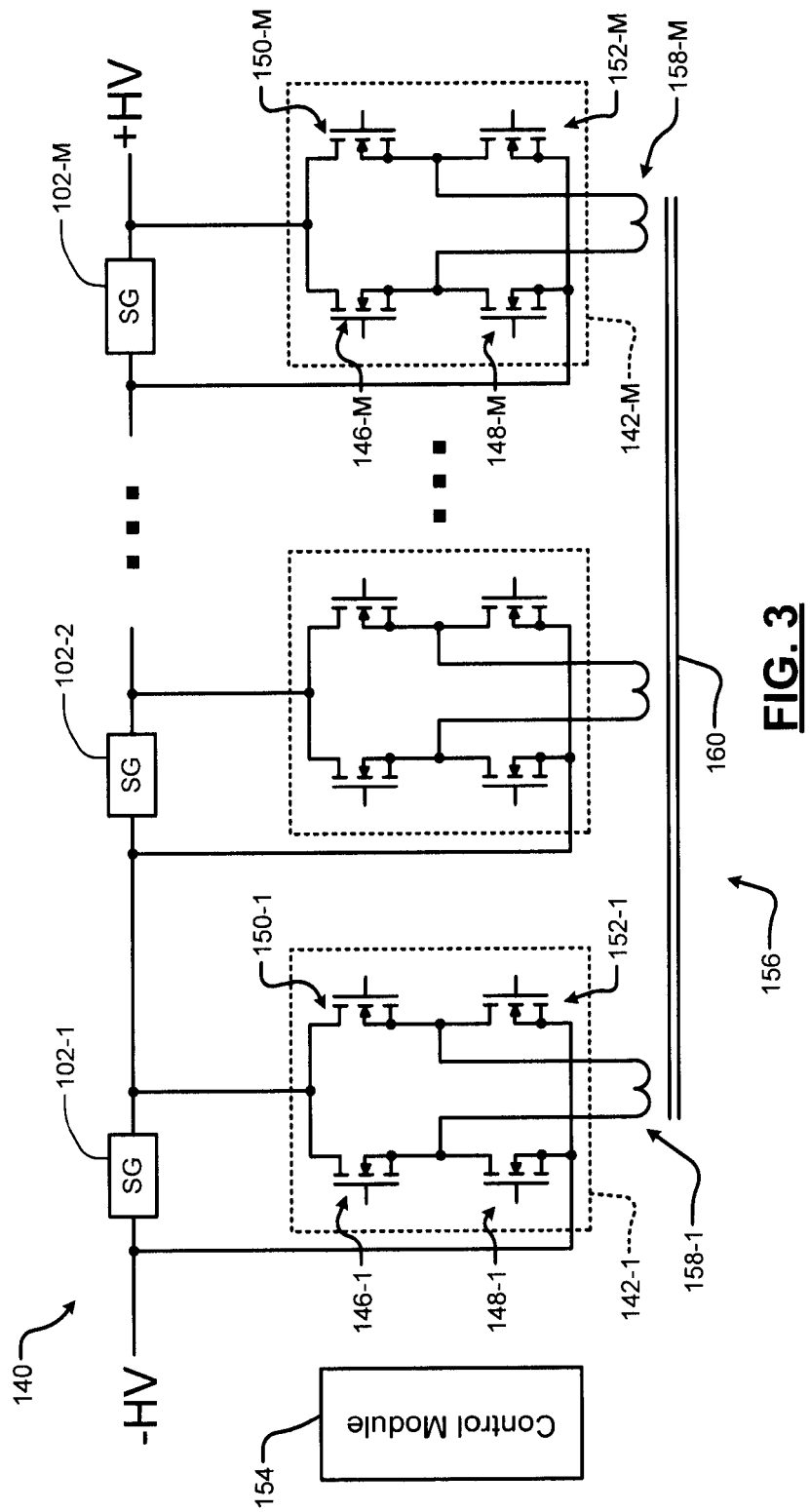
FIG. 3 is an electrical schematic and block diagram of a cell balancing system for plurality of sub-groups of battery cells according to the present disclosure.

Referring now to FIG. 3, a second cell balancing system 140 for plurality of sub-groups (SGs) 102 of battery cells is shown. In this example, there are M sub-groups of battery cells, where M is an integer greater than one.

The second cell balancing system 140 includes a control module 154 that controls switching circuits 142-1, 142-2, . . . , and 142-N (collectively switching circuits 142). Each of the switching circuits 142-1, 142-2, . . . , and 142-N includes switches 146-1, 146-2, . . . , and 146-N, 148-1, 148-2, . . . , and 148-N, 150-1, 150-2, . . . , and 150-N and 152-1, 152-2, . . . , and 152-N, respectively.

For example, the switching circuit 142-1 includes series-connected switches 146-1 and 148-1 that are connected in parallel with series-connected switches 150-1 and 152-1. A second terminal of the switch 146-1 and a first terminal of the switch 148-1 are connected to one input of a transformer 156 (via one end of windings 158-1 wound around a core 160). A second terminal of the switch 150-1 and a first terminal of the switch 152-1 are connected to another input of the transformer 156 (via another end of windings 158-1 wound around the core 160).

First terminals of the switches 146-1 and 150-1 are connected to a first terminal of a corresponding one of the sub-groups 102. For example, the first battery terminal may be a positive terminal of the sub-group 102-1. Second terminals of the switches 148-1 and 152-1 are connected to a second terminal of a corresponding one of the sub-groups 104. For example, the second terminal may be a negative terminal of the sub-group 102-1.

In use, the switching circuits 142 switch the polarity of the connection from the sub-group 104 to the transformer 156 at a second desired frequency, which equalizes the charge of the sub-groups 102. The second desired frequency can be the same as or different than the first desired frequency.

In some examples, the switches can be n-channel or p-channel MOSFET transistors, although other transistors may be used. In some examples, each of the transistors is arranged in an isolation pocket that is insulated from remaining portions of the integrated circuit. In some examples, the control module and the switching circuits for one or more sub-groups are implemented as an integrated circuit or an integrated circuit package.

Figure 4:
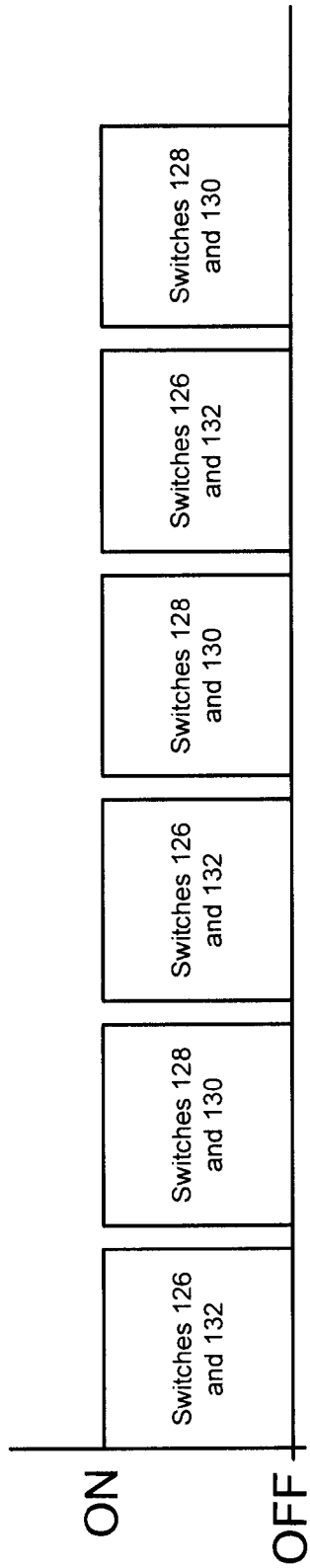
FIGS. 4 and 5 are timing diagrams showing switching of switches in the cell balancing system for the battery cells and for sub-groups of battery cells, respectively, according to the present disclosure.
Figure 5:
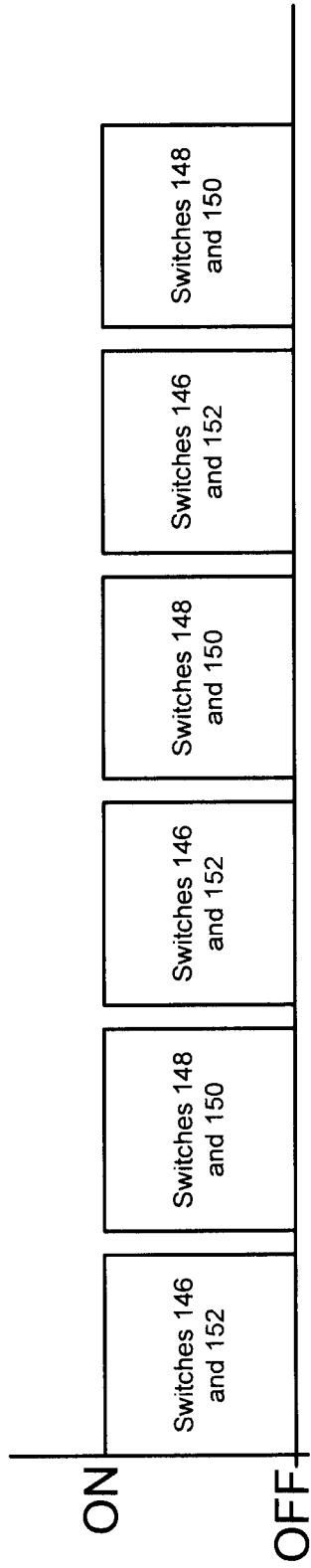
Figure 7:
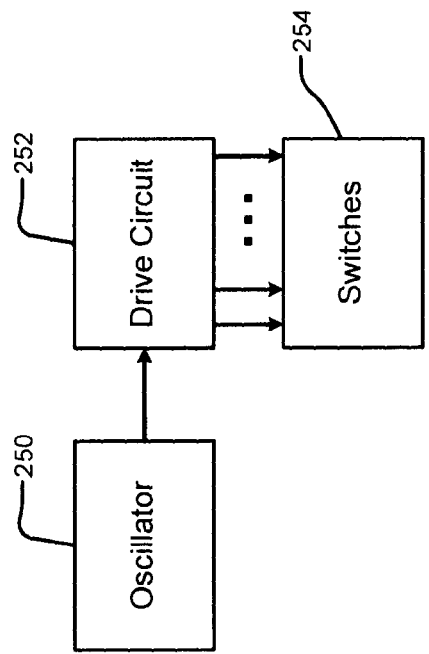
FIG. 7 illustrates an exemplary control module that generates drive signals.

Referring now to FIGS. 4 and 5, example timing diagrams for the switching circuits 114 for the battery cells 102 and for the switching circuit 142 for the sub-groups 102, respectively, are shown. In FIG. 4, during a first half period, switches 126 and 132 are ON and switches 128 and 130 are OFF. During a second half period, switches 128 and 130 are ON and switches 126 and 132 are OFF. In FIG. 5, during a first half period, switches 146 and 152 are ON and switches 148 and 150 are OFF. During a second half period, switches 148 and 150 are ON and switches 146 and 152 are OFF.

As can be appreciated, while synchronous switching of the switching circuits for the battery cells in FIG. 4 and for the subgroups in FIG. 5 is shown, the switching does not need to be synchronous. Asynchonous switching of the battery cells in FIG. 4 relative to the subgroups in FIG. 5 can be performed. In some examples, the switching may be performed at a desired frequency. For example, the frequency can be in the range of 50 kHz to 150 kHz. For example, the desired frequency can be 100 kHz or another suitable frequency. In some examples, the switching of the battery cells is performed at a different frequency than switching of the sub-groups. In some examples, the switching circuit 142 is switched at an integer multiple or divisor of the switching frequency of the switching circuit 114.

Figure 6:
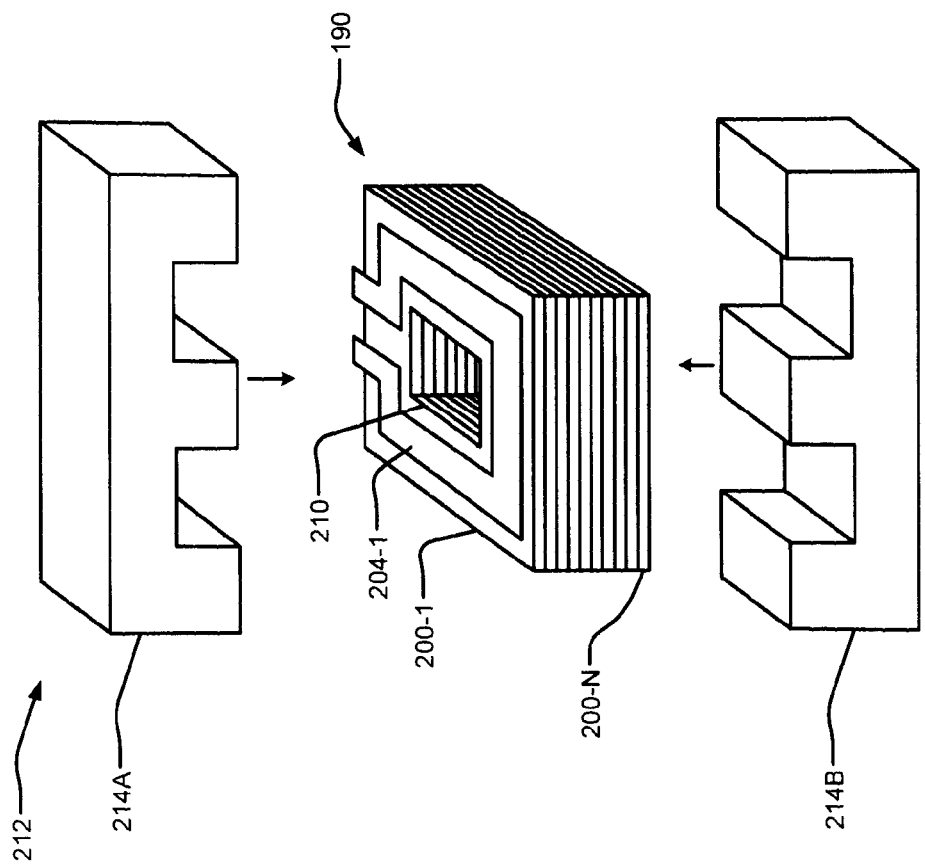
FIG. 6 illustrates an exemplary transformer according to the present disclosure.

Referring now to FIG. 6, an example of a suitable transformer is shown. The transformer 190 includes a plurality of printed circuit boards (PCBs) 200-1, 200-2, . . . , and 200-N (collectively PCBs 200). Each of the PCBs 200 includes one or more windings 204 (such as winding 204-1 shown in FIG. 6). The windings 204 may include traces formed on the PCBs 200. The PCBs 200 also include a central opening 210. A core 212 may include first and second core sections 214A and 214B.

In some examples, the first and second core sections 214A and 214B may have an "E"-shaped cross section, although other cores may be used. Each of the center legs of the first and second core sections 214A and 214B may be inserted approximately half-way into the central opening 210 of the PCBs 200. Outer legs of the first and second core sections 214A and 214B are arranged adjacent to opposite sides of the PCBs 200. In some examples, the PCBs 214 may have a surface area of 1 to 2 cm$^2$ and the core 212 may be made of Ferrite or another suitable core material. While a single winding is shown, multiple windings may be used. In some examples, the windings may be arranged on both sides of the PCBs.

The cell balancing system according to the present disclosure has relatively high electrical efficiency and topological and computational simplicity. There is no accurate measurement requirement required to implement the cell balancing system. Nonetheless, current and/or voltage balancing may be performed at the battery cell level and/or the sub-group level. The current and/or voltage feedback can be used to adjust the switching frequency or other parameters if needed. Furthermore, the cell balancing system according to the present disclosure has minimal reactive energy storage, either inductive or capacitive.

Referring now to FIG. 6, drive signals for the switches may be generated by a circuit including a signal generator such as an oscillator 250 and a driver circuit 252 that generates the drive signals for switches 254 based on an output frequency of the signal generator 250. Alternately, the drive signals for the switches can be generated by a controller such as an existing vehicle controller. Examples of suitable existing controllers include a powertrain controller, a battery controller, an engine controller or another similar controller.

For purposes of clarity, the same reference numbers are used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A battery cell balancing system, comprising:
   N switching circuits connected to first terminals and second terminals of N battery cells, respectively, where N is an integer greater than one;
   a first transformer comprising a first core and N sets of windings wound around the first core, wherein the N sets of windings are connected to the N switching circuits, respectively; and
   a first control module that controls switching of the N switching circuits to reverse first connections between the first terminals and the second terminals of the N battery cells and the N sets of windings, respectively, at a first frequency to balance charge levels of the N battery cells.

2. The battery cell balancing system of claim 1, wherein the N battery cells are connected in series.

3. The battery cell balancing system of claim 1, wherein each of the N switching circuits includes:
   a first switch and a second switch connected in series between the first terminal and the second terminal of one of the N battery cells; and
   a third switch and a fourth switch connected in series between the first terminal and the second terminal of the one of the N battery cells,
   wherein a first terminal of one of the N sets of windings is connected between the first switch and the second switch and a second terminal of the one of the N sets of windings is connected between the third switch and the fourth switch.

4. The battery cell balancing system of claim 3, wherein:
   the first control module switches the first switch and the fourth switch on and the second switch and the third switch off during one portion of a switching period; and
   the first control module switches the first switch and the fourth switch off and the second switch and the third switch on during another portion of the switching period.

5. A battery system comprising:
   M battery subgroups, wherein M is an integer greater than one, and wherein each of the M battery subgroups includes:
      N battery cells, where N is an integer greater than one;
      a battery cell balancing system, comprising:
         N switching circuits connected to first terminals and second terminals of the N battery cells, respectively;
         a first transformer comprising a first core and N sets of windings wound around the first core, wherein the N sets of windings are connected to the N switching circuits, respectively; and
         a first control module that controls switching of the N switching circuits to reverse first connections between the first terminals and the second terminals of the N battery cells and the N sets of windings, respectively, at a first frequency to balance charge levels of the N battery cells.

6. The battery system of claim 5,
   M switching circuits connected to a first terminal and a second terminal of M battery subgroups, respectively;
   a second transformer comprising a second core and M sets of windings wound around the second core, wherein the M sets of windings are connected to the M switching circuits, respectively; and
   a second control module that controls switching of the M switching circuits to reverse second connections between the first terminal and the second terminal of the M battery subgroups and the M sets of windings, respectively, at a second frequency to balance charge levels of the M battery subgroups.

7. The battery system of claim 6, wherein the first frequency is equal to the second frequency.

8. The battery system of claim 6, wherein each of the M switching circuits includes:
   a first switch and a second switch connected in series between the first terminal and the second terminal of one of the M battery subgroups; and
   a third switch and a fourth switch connected in series between the first terminal and the second terminal of the one of the M battery subgroups,
   wherein a first terminal of one of the M sets of windings is connected between the first switch and the second switch and a second terminal of the one of the M sets of windings is connected between the third switch and the fourth switch.

9. The battery system of claim 8, wherein:
   the second control module switches the first switch and the fourth switch on and the second switch and the third switch off during one portion of a switching period, and
   the control module switches the first switch and the fourth switch off and the second switch and the third switch on during another portion of the switching period.

10. The battery cell balancing system of claim 1, wherein the first transformer comprises:
    N printed circuit boards each including:
       a substrate defining a central opening; and
       a conductive trace formed on the substrate and arranged around the central opening,
    wherein the first core includes a first "E"-shaped core section and a second "E"-shaped core section, and wherein middle legs of the first "E"-shaped core section and the second "E"-shaped core section are inserted into the central openings of the N printed circuit boards and outer legs of the first "E"-shaped core section and the second "E"-shaped core section are arranged outside of the N printed circuit boards.

11. The battery system of claim 6, wherein the second transformer comprises:
M printed circuit boards each including:
a substrate defining a central opening; and
a conductive trace formed on the substrate and arranged around the central opening,
wherein the second core includes a first "E"-shaped core section and a second "E"-shaped core section, and
wherein middle legs of the first "E"-shaped core section and the second "E"-shaped core section are inserted into the central openings of the M printed circuit boards and outer legs of the first "E"-shaped core section and the second "E"-shaped core section are arranged outside of the M printed circuit boards.

12. A method of balancing battery cells in a battery subgroup, comprising:
connecting N switching circuits to first and second terminals of N battery cells, respectively, where N is an integer greater than one;
connecting N sets of windings of a first transformer having a first core to the N switching circuits, respectively; and
switching the N switching circuits to reverse first connections between the first terminal and the second terminal of the N battery cells and the N sets of windings, respectively, at a first frequency to balance charge levels of the N battery cells.

13. The method of claim 12, wherein the N battery cells are connected in series.

14. The method of claim 12, wherein each of the N switching circuits includes:
a first switch and a second switch connected in series between the first terminal and the second terminal of one of the N battery cells; and
a third switch and a fourth switch connected in series between the first terminal and the second terminal of the one of the N battery cells,
wherein a first terminal of one of the N sets of windings is connected between the first switch and the second switch and a second terminal of the one of the N sets of windings is connected between the third switch and the fourth switch.

15. The method of claim 14, wherein the switching of the N switching circuits comprises:
switching the first switch and the fourth switch on and the second switch and the third switch off during one portion of a switching period; and
switching the first switch and the fourth switch off and the second switch and the third switch on during another portion of the switching period.

16. The method of claim 12, further comprising:
providing M of the battery subgroups, where M is an integer greater than one;
connecting M switching circuits to a first terminal and a second terminal of the M battery subgroups, respectively;
connecting M sets of windings of a second transformer having a second core to the M switching circuits, respectively; and
switching the M switching circuits to reverse second connections between the first terminal and the second terminal of the M battery subgroups and the M sets of windings, respectively, at a second frequency to balance charge levels of the M battery subgroups.

17. The method of claim 16, further comprising switching the first connections at a first frequency and the second connections at a second frequency.

18. The method of claim 17, wherein the first frequency is equal to the second frequency.

* * * * *

UNITED STATES PATENT AND TRADEMARK OFFICE
CERTIFICATE OF CORRECTION

PATENT NO. : 9,153,973 B2  
APPLICATION NO. : 13/494255  
DATED : October 6, 2015  
INVENTOR(S) : Mehmet Kadri Nalbant It is certified that error appears in the above-identified patent and that said Letters Patent is hereby corrected as shown below:

Title Page, Column 1,  
Item [73] Assignee     Insert --MAXIM INTEGRATED PRODUCTS, INC., San Jose, CA (US)--

In the Specification:

| | |
|---|---|
| Column 5, Line 19 | Delete "142-N" and insert --142-M-- |
| Column 5, Line 20 | Delete "142-N" and insert --142-M-- |
| Column 5, Line 21 | Delete "146-N," and insert --146-M,-- |
| Column 5, Line 22 | Delete "148-N," and insert --148-M,-- |
| Column 5, Line 22 | Delete "150-N" and insert --150-M-- |
| Column 5, Line 23 | Delete "152-N," and insert --152-M,-- |
| Column 5, Line 39 | Delete "104." and insert --102.-- |
| Column 5, Line 43 | Delete "104" and insert --102-- |
| Column 5, Line 56 | Delete "102" and insert --104-- |
| Column 6, Line 1 | Delete "Asynchonous" and insert --Asynchronous-- |
| Column 6, Line 29 | Delete "214" and insert --200-- |

Signed and Sealed this  
Sixteenth Day of August, 2016

Michelle K. Lee  
*Director of the United States Patent and Trademark Office*